United States Patent
Vecchio et al.

(10) Patent No.: US 7,621,435 B2
(45) Date of Patent: Nov. 24, 2009

(54) DESIGNS AND FABRICATION OF STRUCTURAL ARMOR

(75) Inventors: Kenneth S. Vecchio, San Diego, CA (US); Aashish Rohatgi, Alexandria, VA (US); John Kosmatka, Encinitas, CA (US)

(73) Assignee: The Regents of the University of California, Oakland, CA (US)

( * ) Notice: Subject to any disclaimer, the term of this patent is extended or adjusted under 35 U.S.C. 154(b) by 111 days.

(21) Appl. No.: 11/629,578

(22) PCT Filed: Jun. 15, 2005

(86) PCT No.: PCT/US2005/021095

§ 371 (c)(1),
(2), (4) Date: Oct. 30, 2007

(87) PCT Pub. No.: WO2006/137823

PCT Pub. Date: Dec. 28, 2006

(65) Prior Publication Data

US 2008/0286600 A1    Nov. 20, 2008

Related U.S. Application Data

(60) Provisional application No. 60/580,867, filed on Jun. 17, 2004.

(51) Int. Cl.
*B23K 1/19* (2006.01)
*B23K 31/02* (2006.01)
(52) U.S. Cl. .................. 228/101; 228/173.2; 228/190
(58) Field of Classification Search .......... None
See application file for complete search history.

(56) References Cited

U.S. PATENT DOCUMENTS

| 1,043,416 | A |   | 11/1912 | Giolitti |  |
|---|---|---|---|---|---|
| 1,097,573 | A |   | 5/1914 | Wales |  |
| 2,438,759 | A | * | 3/1948 | Liebowitz | 228/175 |
| 3,592,147 | A |   | 7/1971 | Harper |  |
| 3,898,729 | A |   | 8/1975 | Greene |  |
| 4,230,013 | A | * | 10/1980 | Wellings | 84/733 |
| 4,607,779 | A |   | 8/1986 | Burns |  |
| 4,665,309 | A | * | 5/1987 | Derbyshire | 219/551 |
| 4,836,084 | A |   | 6/1989 | Vogelesang et al. |  |
| 4,853,294 | A |   | 8/1989 | Everett et al. |  |

(Continued)

FOREIGN PATENT DOCUMENTS

DE    41 25 100    2/1993

(Continued)

OTHER PUBLICATIONS

PCT International Search Report and Written Opinion of the International Searching Authority for PCT/US05/21095, Jan. 5, 2007.

(Continued)

*Primary Examiner*—Kiley Stoner
(74) *Attorney, Agent, or Firm*—Fish & Richardson P.C.

(57) ABSTRACT

Fabrication techniques for and examples of metallic composite materials with high toughness, high strength, and lightweight for various structural, armor, and structural-armor applications. For example, various advanced materials based on metallic-intermetallic laminate (MIL) composite materials are described, including materials with passive damping features and built-in sensors.

22 Claims, 13 Drawing Sheets

U.S. PATENT DOCUMENTS

| | | | |
|---|---|---|---|
| 4,869,974 | A | 9/1989 | Oskarsson et al. |
| 4,911,990 | A | 3/1990 | Prewo et al. |
| 5,098,469 | A | 3/1992 | Rezhets |
| 5,256,202 | A | 10/1993 | Hanamura et al. |
| 5,260,137 | A | 11/1993 | Rosenthal et al. |
| 5,538,795 | A | 7/1996 | Barbee et al. |
| 5,606,146 | A | 2/1997 | Danen et al. |
| 5,635,288 | A | 6/1997 | Park |
| 5,775,049 | A | 7/1998 | Fricke |
| 5,820,348 | A | 10/1998 | Fricke et al. |
| 5,924,261 | A | 7/1999 | Fricke et al. |
| 6,357,332 | B1 | 3/2002 | Vecchio |
| 6,614,723 | B2 | 9/2003 | Pearce et al. |
| 6,984,352 | B1* | 1/2006 | Akopyan ............... 264/219 |
| 7,188,559 | B1 | 3/2007 | Vecchio |
| 2002/0179688 | A1* | 12/2002 | Sanders ................ 228/193 |
| 2006/0060632 | A1* | 3/2006 | Kleber ................. 228/101 |
| 2008/0093418 | A1* | 4/2008 | Weihs et al. ........... 228/101 |
| 2008/0111944 | A1* | 5/2008 | Sakai .................... 349/61 |
| 2009/0087681 | A1* | 4/2009 | Decker et al. .......... 428/649 |

FOREIGN PATENT DOCUMENTS

| | | |
|---|---|---|
| WO | WO 2006/137823 | 3/2007 |

OTHER PUBLICATIONS

Asanuma, H., "The Development of Metal-Based Smart Composites," Journal of Metals, 52, pp. 21-25 (2000).

Caponero, M.A. et al., "Strain Measurements with FBGs Embedded into Cast Metal Alloys," Information and Innovation in Composites Technologies: Proceedings of the 7th Japan International SAMPE Symposium & Exhibition, T. Ishikawa et al. (Eds.), Tokyo, Japan, Nov. 13-16, 2001 pp. 661-664 (2001).

Fricke, J.R., "Lodengraf Damping—An Advanced Vibration Damping Technology," Journal of Sound and Vibration, 34(7), pp. 22-27 (2000).

Fricke et al., "Low-Density Granular Fill for Damping Structural Vibrations," J. Acoust. Soc. Am., vol. 98, No. 5, Pt. 2, p. 2889-2890 (Nov. 1995).

Friend, R.D. And V.K. Kinra, "Particle Impact Damping," Journal of Sound and Vibration 233(1): 93-118 (2000).

Harach, D.J. and K. S. Vecchio, "Microstructure Evolution in Metal-Intermetallic Laminate (MIL) Composites Synthesized by Reactive Foil Sintering in Air," Metallurgical and Materials Transactions, 32A, pp. 1493-1505 (2001).

Harach, D.J., "Processing, Properties, and Ballistic Performance of Ti-Al$_3$Ti Metal-Internetallic Laminate (MIL) Composites," Ph.D. Thesis, University of California, San Diego, 2000, 250 pages.

Menig, R. et al., "Quasi-static and Dynamic Mechanical Response of *Haliotis rufescens* (Abalone) Shells," Acta Materialia, 48: 2383-2398 (2000).

Menig et al., "Quasi-Static and dynamic mechanical response of *Stombus gigas* (conch) shells," Material Science & Engineering A297: 203-211 (2001).

Rohatgi, A. et al., "Development of Multifunctional Metallic-Intermetallic Laminate (MIL) Composites with Particulate-based Damping," Proceedings of the 16th Annual Technical Conference of the American Society for Composites, Virgina Tech, Blacksburg, VA, USA, Sep. 9-12, 2001, 9 pages.

Rohatgi, A. et al., "Development of Multifunctional Metallic-Intermetallic Laminate (MIL) Composites with Particulate-based Damping," 16th Annual Technical Conference of the American Society for Composites, Virgina Tech, Blacksburg, VA, USA, Sep. 9-12, 2001, presentation slides (31 sheets).

Rohatgi, A. et al., "Development of Vibration Damping Techniques in Metallic-Intermetallic Laminate (MIL) Composites," The Minerals, Metals and Materials Society (MPMD) Third Global Symposium Processing and Properties of Lightweight Cellular Metals and Structures, Feb. 20, 2002, Seattle, Washington, pp. 325-326.

Rohatgi, A. et al., "Development of Vibration Damping Techniques in Metallic-Intermetallic Laminate (MIL) Composites, "The Minerals, Metals and Materials Society (MPMD) Third Global Symposium Processing and Properties of Lightweight Cellular Metals and Structures, Feb. 20, 2002, Seattle, Washington, presentation slides (32 sheets).

Rohatgi, A. et al., "Resistance-curve and fracture behavior of Ti-Al$_3$Ti metallic-intermetallic laminate (MIL) composites," Acta Materialia 51: 2933-2957 (2003).

Sarikaya, M., "An Introduction to Biomimetics: A Structural Viewpoint," Microscopy Research and Technique, 27: 360-375 (1994).

Sarikaya, M. and I.A. Aksay, "Nacre of Abalone Shell: a Natural Multifunctional Nanolaminated Ceramic-Polymer Composite Material," Chapter 1 in *Structure, Cellular Synthesis and Assembly of Biopolymers* (*Results and Problems in Cell Differentiation 19, Biopolymers*), Steven T. Case (Ed.), Berlin, Germany: Springer Verlag, pp. 1-26 (1992).

Sarikaya, M. et al., "Mechanical Property-Microstructural Relationships in Abalone Shell," Materials Research Society, Proceedings, vol. 174, pp. 109-116 (1990).

Sauthoff, G., "Titanium Aluminides and Related Phases," Chapter 3 in *Intermetallics*, Weinheim, Federal Republic of Germany: VCH, p. 14-38 (1995).

Varin, R.A. et al., "Fracture toughness of intermetallic compacts consolidated from nanocrystalline powders," Materials Science and Engineering, vol. A300, pp. 1-11 (2001).

Vecchio, K.S., "Synthetic Multifunctional Materials by Design Using Metallic-Intermetallic Laminate (MIL) Composites," Symposium in Honor of Professor Gareth Thomas' 70th Birthday from the Fall 2002 TMS Meeting in Columbia, Ohio, 15 pages.

Warwick, D. and D. Fern,, "An evaluation of polyethylene beads as a damping treatment for tubular truss structures," Carderock Division Naval Surface Warfare Center, CDNSWC-SIG-94-146-7250, Oct. 1994, 41 pages.

Yasrebi, M. et al., "Biomimetic Processing of Ceramics and Ceramic-Metal Composites," Materials Research Society Symposium Proceedings, vol. 180, pp. 625-635 (1990).

\* cited by examiner

DESIGNS AND FABRICATION OF STRUCTURAL ARMOR

This application is a national stage application of and claims the benefit of PCT/US 2005/021095 filed on Jun. 15, 2005, which claims the benefit of U.S. Provisional Patent Application No. 60/580,867, entitled "DESIGNS AND FABRICATION OF STRUCTURAL ARMOR", and filed on Jun. 17, 2004. Both applications are incorporated herein by reference in their entirety.

BACKGROUND

This application relates to structural armor materials, their designs, fabrication, and applications.

Structural armor materials are specially designed to exhibit high material strengths and resistance to ballistic impacts. Such materials may be used to protect persons, and various objects such as motor vehicles, aircraft, and buildings, from ballistic and other harmful impacts. One type of structural armor materials use multi-layer composite structures of different material layers to form metallic intermetallic laminate (MIL) composites. MIL composites may be designed to be relatively light in comparison to various other armor materials. U.S. Pat. No. 6,357,332, for example, describes examples of MIL composite armors and associated fabrication processes.

SUMMARY

This application includes, among others, structural designs and fabrication of metallic materials based on metallic-intermetallic laminate (MIL) composite materials.

In one implementation, a metal box is provided to have an opening and a metal lid plate for closing the opening. A stack of alternating first metal and second metal layers is placed inside the metal box. A first metal in the first metal layers and a second metal in the second metal layers are operable to react under heat and pressure to form an intermetallic material. The opening is then closed by the metal lid plate to compress the stack inside the box to contact each inner metal wall of the box. Pressure and heat are then applied to the closed metal box to compress the stack and to cause reaction between two adjacent layers in the stack and reaction between the stack and each inner metal wall of the box to form metallurgical bonding between adjacent layers in the stack and between the stack and the metal box.

In another implementation, a substrate made of a first metal is provided to include a surface. A metal sheet made of a second metal is then placed on the substrate in contact with at least a portion of the surface. Pressure and heat are applied to the substrate and the metal sheet to compress the metal sheet against the surface to cause reaction between the metal sheet and the surface and to form an intermetallic compound.

An article of manufacture is also disclosed as an example. This article includes a stack of alternating metal and intermetallic layers metallurgically bonded to one another, and cavities in at least one intermetallic layer and filled with a filling material. Each metal layer includes a first metal and each intermetallic layer includes an alloy of the first metal and a second metal.

In another example, an article of manufacture is described to include a metal substrate and a stack of alternating metal and intermetallic layers metallurgically bonded to one another and to a surface of the metal substrate. Each metal layer includes a first metal and each intermetallic layer includes a compound of the first metal and a second metal. The thickness values of the layers in the stack are spatially graded.

In yet another example, an article of manufacture may include a substrate including a first metal and a stack of alternating metal and intermetallic layers metallurgically bonded to one another and to a surface of the substrate. Each metal layer includes the first metal and each intermetallic layer includes a compound of the first metal and a second metal. The article further includes metal wires penetrating through the stack and each having a portion embedded in the substrate. Each metal wire is metallurgically bonded to the stack and substrate.

In yet another example, this application describes a structure that includes a stack of alternating metal and intermetallic layers and at least one sensor embedded in the stack. The layers are metallurgically bonded to one another. Each metal layer includes the first metal and each intermetallic layer includes a compound of the first metal and a second metal. The sensor is operable to measure a parameter indicative of a condition of the stack.

Furthermore, this application describes an article of manufacture that includes a stack of alternating metal and intermetallic layers metallurgically bonded to one another, and a closed metal box enclosing the stack. Each metal layer comprises a first metal and each intermetallic layer comprises an alloy of the first metal and a second metal. Each inner wall of the closed metal box is metallurgically bonded to the stack.

These and other implementations are described in greater detail in the attached drawings, the detailed description, and the claims.

DETAILED DESCRIPTION

Various metallic-intermetallic laminate (MIL) composites are known for their material strengths, especially at high temperatures. Typically, a MIL composite may be fabricated from pressing a stack of interleaving metal layers made of a first metal with a high toughness and being ductile, and a second metal suitable for reacting with the first metal to form an intermetallic compound at a high temperature The resultant. MIL layer exhibits a ceramic-like material properties such as a high material strength and a high material stiffness. The final laminated composite material essentially retains the ceramic-like strength and stiffness of the MIL layers and the toughness and some of the ductility of the first metal. The processing under the high temperature may be controlled to cause the second metal to completely react with the first metal so that the final structure is essentially a fused or laminated stack of MIL layers interleaved with remaining first metal layers. Such MIL composite materials may be used as armor layers to resist ballistic impacts and to protect persons, animals, and various objects. Some examples of such MIL composite materials are described in U.S. Pat. No. 6,357,332, the entire disclosure of which is incorporated by reference as part of the specification of this application.

For example, MIL materials may be made from titanium and aluminum to form a $Al_3Ti/Ti$ intermetallic compound with excellent material strength, stiffness, and toughness. Notably, this material can have a high corrosion resistance and are light in weight. The titanium metal with a high toughness may be replaced by other metal materials with a high toughness. Examples include a titanium alloy, nickel, a nickel alloy, vanadium, a vanadium alloy, iron, an iron alloy, tantalum, a tantalum alloy, and any combination of two or more materials selected from titanium, nickel, vanadium, iron, tantalum and their alloys, or any other metal that forms aluminides. The aluminum may be replaced by an alloy of aluminum, an aluminum metal-matrix composite, an aluminum-infiltrated ceramic composite, or all together replaced by magnesium, magnesium alloys, a magnesium metal-matrix composite, or a magnesium-infiltrated ceramic composite. In the situation of the second metal being magnesium-based, the first metals can now include aluminum-based metals and composites. When the second metal is magnesium-based, the intermetallic phase will be a compound of magnesium and the first metal. The example of the MIL composites being based on titanium and aluminum will be used throughout this patent, but it is understood that these metals can be replaced by any of the first and second metals described above.

Figure 1A:
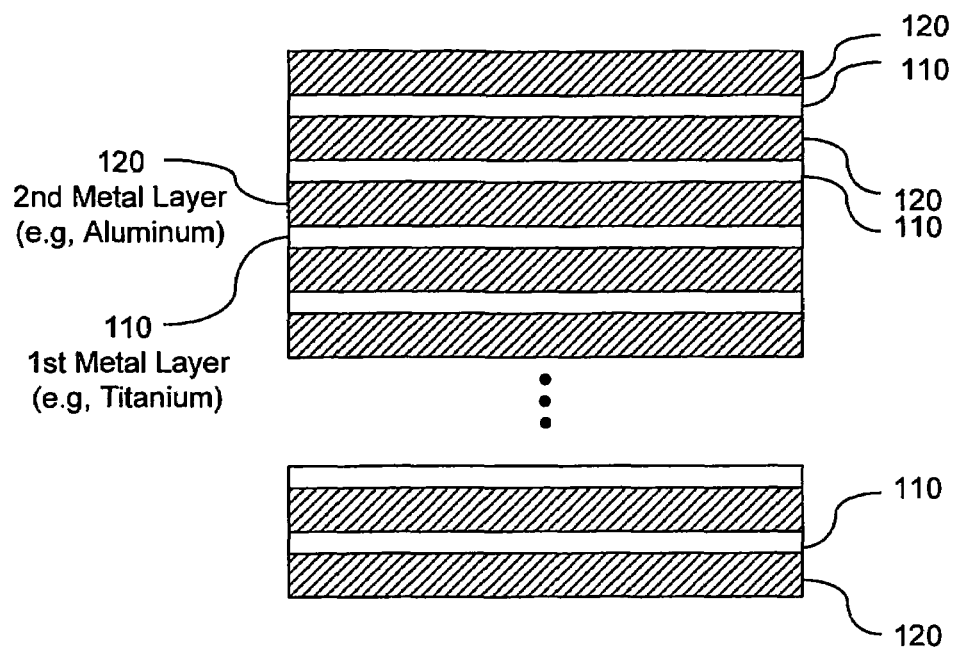
FIGS. 1A, 1B, and 1C illustrate examples of metallic-intermetallic laminate (MIL) composites.
Figure 1B:
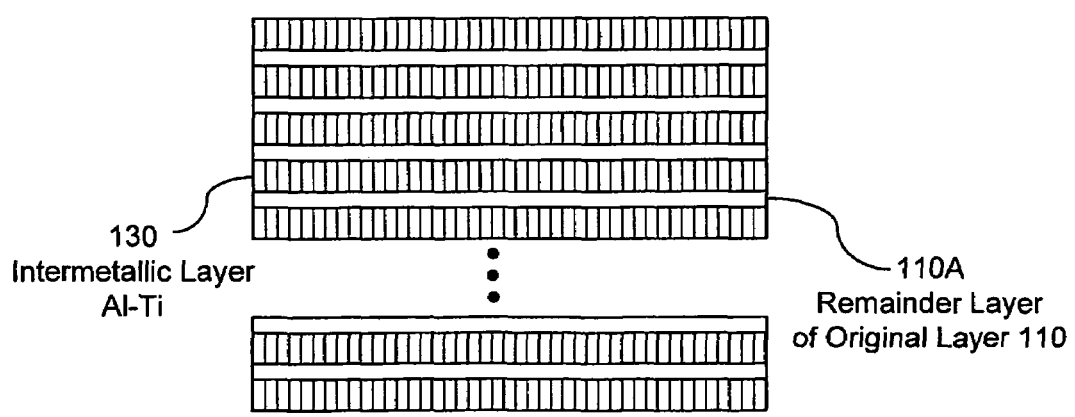

FIG. 1 illustrates an exemplary initial stack of alternating metal layers 110 and 120 for a MIL composite material prior to the pressing fabrication under a high temperature. The metal layers are 110 are made of a first metal of a high toughness such as titanium. The metal layers 120 are made of a second metal such as Al or its alloy. After the proper pressing, the first and second metals react with each other and sacrifice the part of each first metal layer 110 and the substantially the entire second metal layer 120 to produce a composite layer 130 sandwiched between two remainder layers 110A of the first metal layers 110. FIG. 1B illustrates the structure of the MIL composite material after the fabrication process.

Figure 1C:
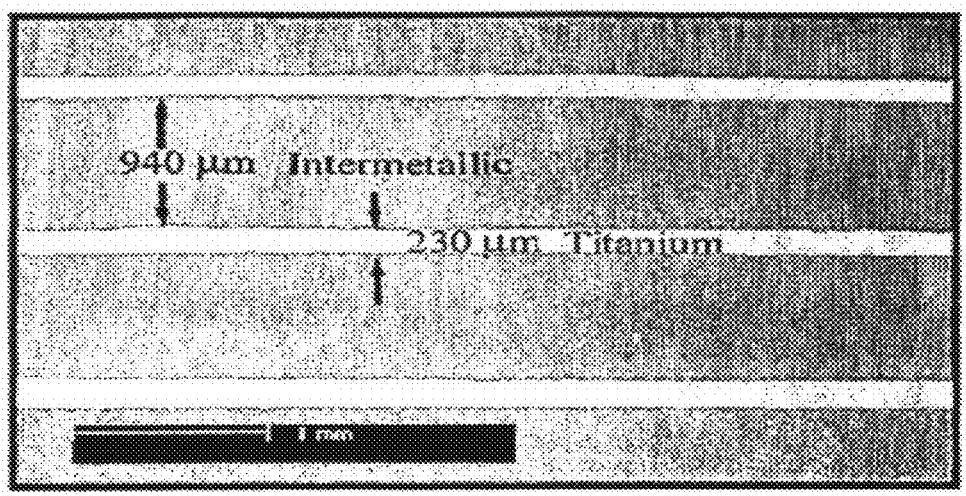

FIG. 1C further shows an example of a $Al_3Ti/Ti$ MIL composite material fabricated by hot pressing through a load-temperature cycle in the air, without utilizing any kind of inert or protective atmosphere. The resultant intermetallic, $Al_3Ti$, possesses a high strength, a high Young's modulus (e.g., 216 GPa), a low density (e.g., 3300 Kg/m3) and a low ductility. The thickness values of the initial titanium and aluminum foils are controlled such that the final composite consists of $Al_3Ti$ as well as un-reacted titanium. The $Ti/Al_3Ti$ MIL composites show excellent specific mechanical properties (such as fracture toughness) that can rival those of conventional metals and ceramics. The high toughness of the MIL composites is primarily attributed to the alternate layering of brittle and ductile layers. The ductile phase reinforcement of brittle materials utilizes crack-laminate interactions to generate a zone of bridging ligaments that restrict crack opening and growth by generating closure tractions in the crack wake and utilize the work of plastic deformation in the ductile metal phase to increase fracture resistance of the composite. Thus, a crack propagating in the brittle $Al_3Ti$ layers is effectively stopped every time it hits the ductile titanium layer.

Figure 2:
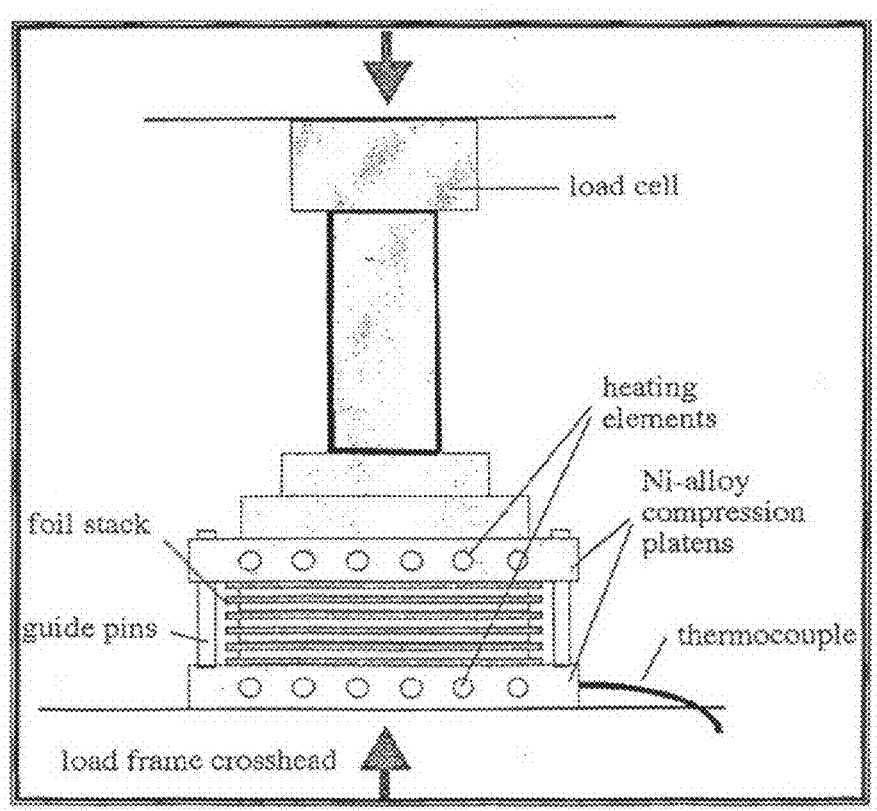
FIG. 2 shows an exemplary system for manufacturing a MIL composite material.

FIG. 2 illustrates one exemplary hot pressing system for making MIL composite materials in the air without a gas-buffered environment. This system allows for fabrication of MIL composites in open air has a number of advantages. For example, vacuum or inert atmospheres generally require greater apparatus cost and processing time, and may also limit the overall size of the samples that can be produced. The open air fabrication removes these and other limitations.

In one implementation of the fabrication process by reacting under heat and pressure, the interleaved first and second metal layers are pressed under pressure. The operating temperature is then raised to a temperature less than a melting point of the one or more second metals and metal alloys but sufficiently high so that, at pressure, the solid state diffusion occurs between the interleaved layers, physically engaging and locking the layers in place. The temperature of the pressured, diffused, locked interleaved layers is raised until all the one or more second metals are reacted with the one or more first metals to form an intermetallic compound. In this process, the temperature is raised at a sufficiently slow pace and under sufficient continuing pressure so that, despite the fact that the reacting proceeds with increasing difficulty and an ultimate high temperature reached is greater than a melting point of the one or more second metals, the one or more second metals remain initially locked in place and ultimately become reacted without squirting in liquid state from between the first metal foils. Next, the material is cooled to the room temperature to form the final structure which includes layers of one or more first metals and metal alloys that are interspersed with regions of a hard intermetallic compound. Notably, each step transpires in the open air with the presence of atmospheric gases. The second metal layers become substantially or completely reacted with the first metal layers nonetheless that the temperature of liquefaction of the at least one second metals and metal alloys from which the second metal layers are made is exceeded during the process.

In the example of the $Al_3Ti/Ti$ composite materials, the diffusion and reaction between titanium and aluminum to form the intermetallic phase $Al_3Ti$ exhibit different behaviors at temperatures significantly below and above the melting point of aluminum (660° C.). At temperatures below the melting point of aluminum, e.g., from 400° C. to 642° C., Al is the major diffusing species. The diffusion of Al is not affected significantly by an interfacial oxide layer, but an interfacial oxide layer reduces the nucleation rate of $Al_3Ti$. Growth of the $Al_3Ti$ intermetallic tends to occur exclusively on the Ti-rich side with a small fraction of Al inclusions, and linear kinetics are observed until the breakdown of the oxide layer, after which parabolic intermetallic growth rates are observed. When oxide films are present between metals, linear kinetics are seen in the early stages of diffusion and later become parabolic. The reaction layer formed is composed of $Al_3Ti$ particles in an aluminum matrix, and solid solutions are generally absent. As an example, foils of commercial purity 1100 aluminum and Ti-3Al-2.5V foils may be stacked in alternating layers and are processed in the composite synthesis apparatus in FIG. 2. The foil dimensions-may be selected to completely consume the aluminum in forming the intermetallic with alternating layers of partially un-reacted Ti metal. Foils may be cleaned in a bath of 2 pct HF in water, rinsed in water, and then rinsed in methanol and rapidly dried in order to remove oxide layers and surface contaminants before processing.

Figure 3:
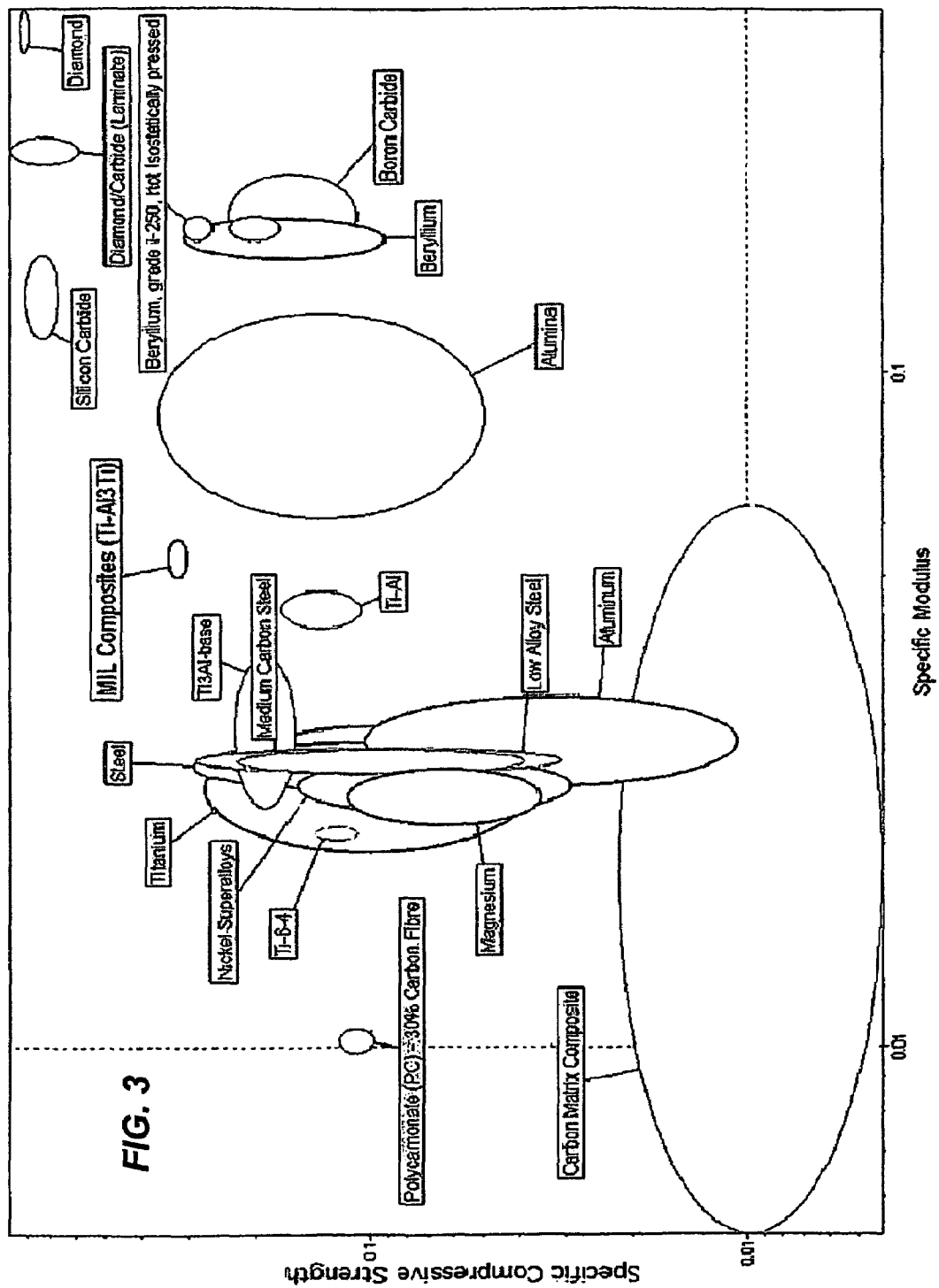
FIG. 3 is a chart that compares material properties of different materials including MIL composites materials exhibiting large specific compressive strengths.

Next, the cleaned foil stack is placed between two cartridge-heated nickel alloy platens and placed on the crosshead of a screw-driven load frame. The synthesis apparatus may be surrounded by ceramic fiber blanket material to reduce heat loss. After foil loading, the pressure is increased to about 3.8 MPa by load control at room temperature to ensure good contact between foils. The temperature is initially raised to 600-650° C. for 2 to 3 hours, while maintaining the pressure, to allow diffusion bonding of the layers and, thus, minimize internal oxidation between the layers. The temperature is then slowly raised through the melting temperature of the second metal and the pressure is reduced to about 2.3 MPa (to eliminate expulsion of liquid phases). The temperature is further raised above the melting point of the second metal, where the pressure drops to about 1.5 MPa as a result of the reaction as liquid phases form over a 2 to 3 hour period; the pressure will then increase as a result of intermetallic solidification to about 3.5 MPa when the bulk of the reaction is complete. The temperature is then increased slowly to 670° C. or above to ensure the reaction has reached the corners of the sample. The sample is then air-cooled while maintaining the pressure at about 3.8 MPa. The Ti—$Al_3Ti$ MIL composites may have the specific stiffness (modulus/density) nearly twice that of steel, the specific toughness and specific strength similar or better than many metallic alloys, and specific hardness close to many ceramic materials. FIG. 3 shows a comparison of different armor materials. The x-axis is the specific modulus of a material on a log scale and the y-axis is the specific compressive strength on a log scale. Good armor materials should be located in the upper right-hand corner of the plot. The location of the MIL composites (red ellipse) is shown to the right (higher specific modulus) of the typical structural metals such as steels, Ti alloys, Ni-superalloys, Al-alloys, and Ti-based intermetallics. The only metallic materials of higher specific stiffness shown are the beryllium alloys. Several ceramic materials are also shown to have higher specific stiffness than the MIL composites, including SiC, $B_4C$, $Al_2O_3$, and diamonds. Clearly, the MIL composites possess has superior material properties for structural applications such as applications demanding high specific stiffness combined with high fracture resistance.

The above examples of MIL composite materials use planar layers. Alternatively, the composite layers may be non-planar and include certain contours or geometries to enhance the structural performance. For example, the metal layers used in a MIL composite material may have corrugations or corrugated features. Such metal layers are stacked and then subjected to heat and pressure to form the MIL structure. The corrugations in different metal layers may be identical to one another and may be different. The corrugations in different metal layers may be spatially shifted relative to one another. Prior to the processing under heat and pressure, the stacked layers may have air pockets or voids between different layers due to the presence of the corrugations. Upon processing, all layers are fused together into a solid composite material.

Figure 4A:
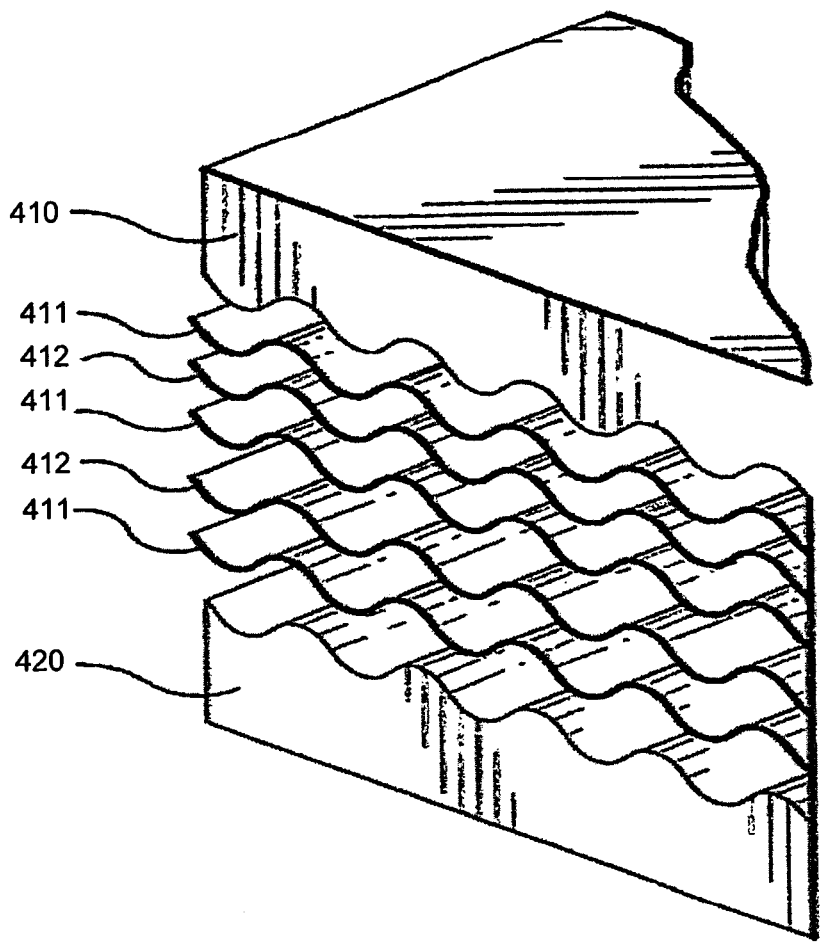
FIGS. 4A and 4B illustrate an example of a MIL composite material having corrugated layers.

FIG. 4A illustrates fabrication of identically corrugated plates 411 and 412 using a pair of corrugated pressing plates 410 and 420. In this example, planar plates of two different metal materials are interleaved to form a stack. This stack of planar plates is then pressed between the pressing plates 410 and 420 to become corrugated plates with identical corrugated patterns under heat and pressure to form a corrugated panel with a MIL structure. Multiple corrugated panels may be used to form a final structure.

Figure 4B:
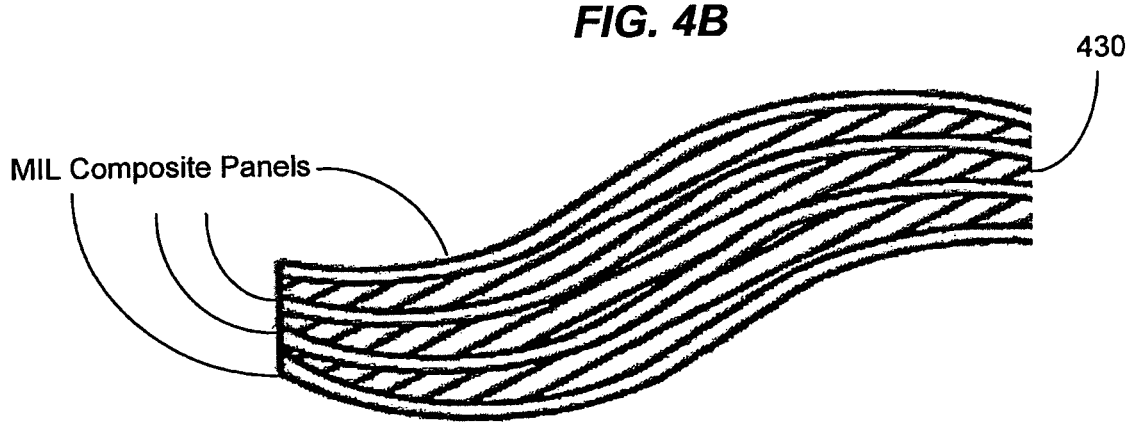

FIG. 4B shows one exemplary structure formed from four identical corrugated panels that are parallel in their corrugated directions and are spatially shifted to misalign the corrugated patterns. The space or volume 430 between two adjacent panels may be filled with a suitable metallic material, such as a metal foam, air, fire retardant, penetration resistant fibers, or any number of materials. Alternatively, successive, corrugated panels of the composite laminate material may also be aligned with their corrugations in an orthogonal orientation.

A corrugated panel is load-bearing in one of its two planar axis, and that several spaced-parallel corrugated panels may suitably bear high loads within, as well as transversely to, their substantial planes. Accordingly, arrayed composite laminate panels are suitable for good construction materials, such as for the sides of armored fighting vehicles, aerospace structures and for buildings.

The above and other corrugated composite laminate materials benefit all mechanical and strength advantages associated with corrugation. For example, a corrugated panel may be capable of better supporting a load aligned with axis of corrugations in the plane of the material without buckling or bending. To this extent the utility of the material for construction, including for load-bearing walls and the sides of armored vehicles, is enhanced. As another example, the corrugations help to turn the path of an impacting projectile. To account for the statistically small probability that the projectile should hit centrally in the trough of a corrugation, it is possible to back one panel of corrugated armor with another, offset, panel. If structural strength is desired in two perpendicular directions in the plane of a composite laminate material described, then corrugated panels of the material having their corrugations running in one direction may be alternated with other panels of the material having their corrugations running at a 90-degree angle.

The above planar and corrugated MIL composite materials may be used to construct various advanced materials for structural, armor, and structural-armor applications. For example, a MIL composite material may be metallurgically bonded to and confined by a metallic box to form a confined MIL composite structure. As another example, the MIL composite layer structure and the associated processing may be used to fabricate a surface layer over a metallic substrate or plate provide a hard protection layer that is resistant to wear and corrosion. In addition, the MIL composite materials may be designed to further harden it by embedding localized materials that are spatially distributed within a MIL composite material. A MIL composite material may also be designed to include, at selected locations, built-in cavities with loose powder and other suitable materials to create an internal vibration-damping mechanism. Furthermore, a MIL composite material may also be designed as an "intelligent" material to include sensors at selected locations to measure and monitor a parameter of the material at these selected locations, such as the magnitude of the impact to the material, the temperature, and other measurable parameters. Examples and implementations of these and other MIL-based materials are now described in the following sections.

Figure 5A:
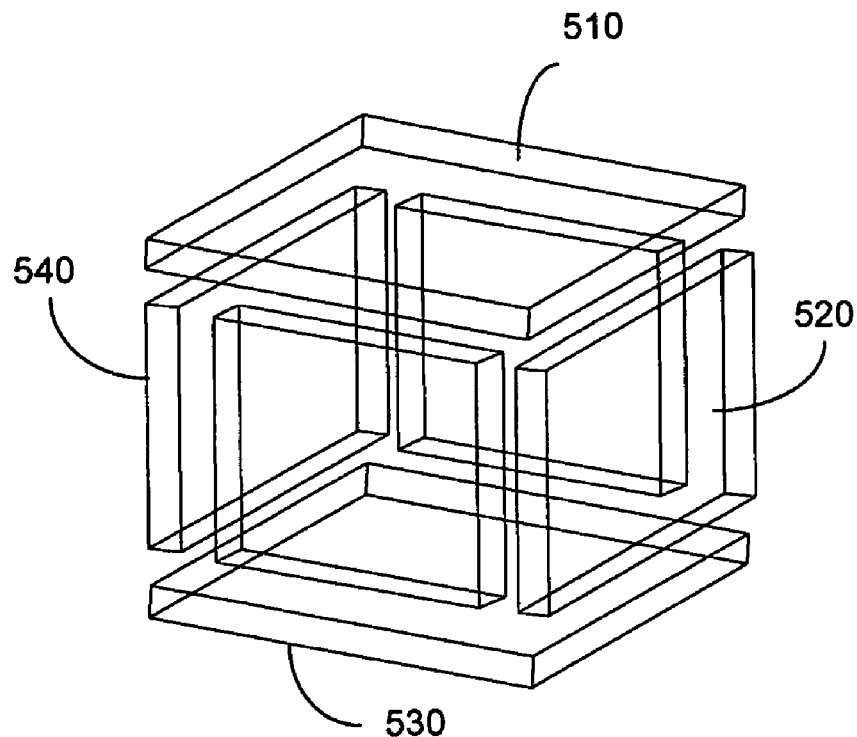
FIGS. 5A and 5B show an example of confined MIL composite material.
Figure 5B:
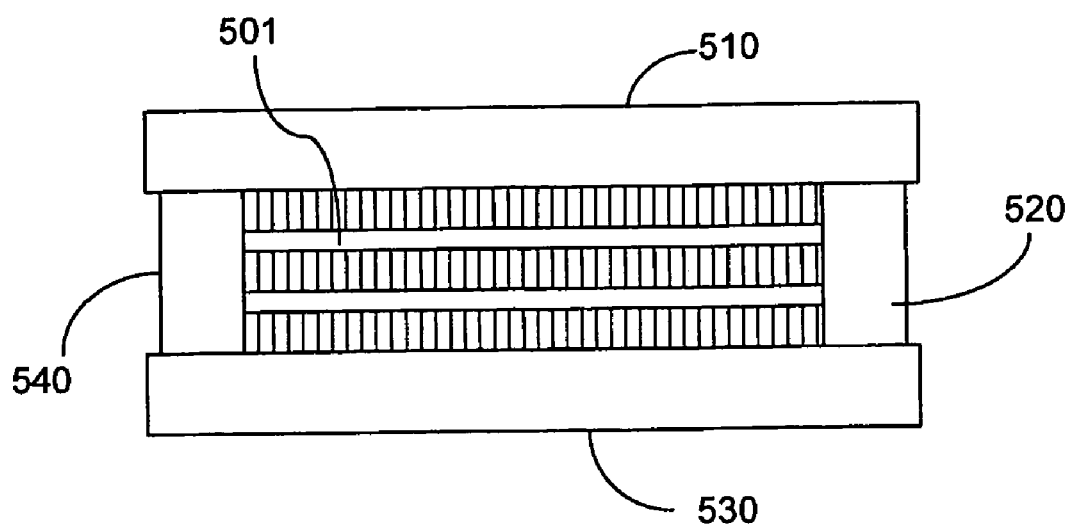

FIGS. 5A and 5B illustrate an exemplary confined MIL material in which a MIL composite material 501 is bonded to and confined within the metallic walls of a metallic box. Notably, the bonding between the MIL composite material 501 and the metallic walls of the box or container is through a reaction between the metallic materials in contact and is metallurgical in nature. A single fabrication process may be used to accomplish both the bonding and the confining processes. Such confined MIL composites may be used to expand the applications and the versatility of MIL composite materials in structural, armor, and structural-armor applications. The confined MIL composite materials have excellent toughness and are effective in stopping and dissipating the energy of incoming projectiles.

Referring to FIG. 5B, the MIL composite material 501, with either planar composite layers or corrugated composite layers, is shown in a cross sectional view to be in contact with four metallic walls 510, 520, 530, and 540 of the box. The box as shown is rectangular in shape and may be in other alternative geometries such as a closed cylindrical shape.

The following describes one exemplary fabrication process for making such a confined MIL composite material where the MIL composite material is assumed to be a Ti/Al$_3$Ti MIL composite, and the metallic walls of the box are assumed to be made of titanium as an example but may be any of the various first metals.

In preparation, the sheets and plates of titanium and aluminum are cleaned by an appropriate method, e.g., mechanical brushing or hydrofluoric acid bath. Sheets of Ti and Al are then interleaved to form a stack. The stacking order is such that aluminum makes the top most and the bottom most layers of the stack. Alternatively, titanium sheets and plates may be replaced by any other metal such as nickel, iron, nitinol etc.

The Ti plates may be welded together to form a box with an opening on one side. The inner dimensions of the box are designed to be close to the dimensions of the stack of the Ti and Al sheets. The stack of cleaned Ti and Al sheets are placed inside the box. The number of sheets is selected to make the height of the stack slightly greater than the height of the box. The box is then closed by pressing down a lid Ti plate on top of the stack. The lid plate is then welded the rest of the box.

If desired, a small tube may also be welded to the box such that the box can be evacuated or back filled with an inert gas. Alternatively, the process of placing the stack in the box and welding of the box may be conducted within an evacuated chamber.

Upon sealing the stack in the box, the entire assembly is heated in a box furnace through a specific time-temperature routine to allow the sheets to react to form the MIL composite as well as the metallurgical bond to the box in the process. The result is a confined MIL composite that is metallurgically bonded to the box.

Such a confined MIL composite material block may be used as a building block for various structures. Multiples of confined MIL composite material blocks may be jointed together to construct large structures. Since the external surfaces of the block is a metal (e.g., Ti), a suitable technique for joining two metal parts may be used to join different confined MIL composite material blocks. For example, welding may be used to joint two blocks together. Large armor panels in various shapes may be constructed from joined blocks.

In some applications, a surface of a metallic substrate, plate, or part may be coated with a hard layer to provide improved surface hardness, strength, and resistance to wear and corrosion. A MIL composite structure and the associated fabrication process may be used to form such a hard layer. The MIL composite layer is designed to have a hardness greater than the hardness of the substrate to which it is bonded, and the specific hardness can be tailored by suitable choice of materials. The hardened surface layer may include layers of, for example, titanium-trialuminide or titanium metal and titanium-trialuminide or titanium metal and titanium trialuminide interspersed with another hard ceramic, such as boron carbide, silicon carbide, tungsten carbide, aluminum oxide, silicon dioxide, or any number of other hard ceramic materials or interdispersed with metallic particles of elements such as: titanium, tungsten, nickel, iron, copper, or any number of other metals and their alloys.

Figure 6:
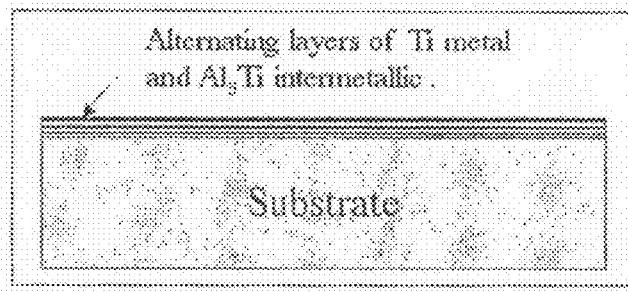
FIGS. 6, 7, 8A, 8B, 8C, 9A, 9B, and 9C show examples of substrates coated with MIL composite layers.

In one implementation, a hardened surface layer may be formed on a metallic substrate such as, but not limited to, titanium and its alloys. The hardened layer may exist on either, any, or all of the exposed or unexposed surface of the substrate. This hardened layer may be a layered structure. As an example, FIG. 6 shows that the layered structure may include alternating layers of titanium (or a titanium alloy), and layers of an intermetallic phase that is generally titanium-trialuminide. The hardness of the intermetallic layer is greater than the hardness of the substrate, while the hardness of the titanium (or the titanium alloy) layer can be the same, greater, or less than that of the substrate. The titanium (or titanium alloy) in the layered structure may be replaced by other metals such as nickel, various kinds of steels etc., in which case the intermetallic layer formed will be an aluminide of this other metal (i.e. an aluminide of nickel, aluminide of iron etc). In another variation, the titanium trialuminide layer may be interspersed with regions of other hard phases such as ceramics. The coefficient of thermal expansion of the various layers in the coating can be carefully matched to that of the substrate layer through the use of various combinations of ceramic materials and/or metals in the intermetallic layer(s) to aid in achieving a good bond with the substrate material.

Alternatively, the hardened layer may not be a layered structure and may be a single layer of titanium trialuminide that is metallurgically formed on the Ti substrate.

The choice of coating material combination, e.g., the use of Titanium/Titanium-trialuminide as the coating material, may be used on a substrate of a material other than titanium. For example, the substrate may be a nickel alloy and the coating may be a MIL composite layer having interleaved Titanium and Titanium-trialuminide layers. As another example, the substrate may be titanium and the coating may be a MIL composite layer having interleaved nickel and nickel-trialuminide layers.

In fabrication of a hard surface layer on a substrate, alternate layers of titanium and aluminum sheets of predetermined thickness are first placed on the titanium substrate. As an example, thickness of the titanium and aluminum sheets may range from about 0.001" to about 0.1". In some implementations, the thickness of all the titanium sheets and that of all the aluminum sheets may be respectively equal to each other, although the thickness of the sheets can vary within the stacking sequence in order to change the resulting hardened layer thickness sequence. The length and the width of all the sheets may be sized to cover a selected portion or the entirety of the substrate.

Next in fabrication, the sheets are pressed under pressure and heat in the ambient air as described with reference to the system shown in FIG. 2. The reaction between the metals on the substrate surface creates a ceramic-like intermetallic layer or a MIL composite layer. This fabrication in the ambient air does not need a processing chamber with a vacuum system and can be generally cheaper and easier than other layer deposition methods such as vapor deposition, sputter coating, case hardening which often require specialized environments and equipment. In another aspect, the present processing technique may be used to form a wide range of thickness of the hard layer. The thickness of the hard layer in our process is orders of magnitudes greater than that achieved by the conventional techniques such as vapor deposition, sputter coating, case hardening etc. The process also may be used to provide the flexibility of varying the hardness distribution of the surface layer by utilizing the interspersed material of varying hardness.

A MIL composite layer as the hard surface on a substrate may be further configured to include various features to improve the performance of the hard layer.

For example, the thickness of the titanium and the aluminum layers may be spatially graded so that the thickness of each titanium layer may be different from the thickness of other titanium layers in the stack, and that the thickness of each aluminum layer may be different from the thickness of other aluminum layers in the stack. This graded layer structure may be used to fine tune the hardness to or close to a desired hardness value.

Figure 7:
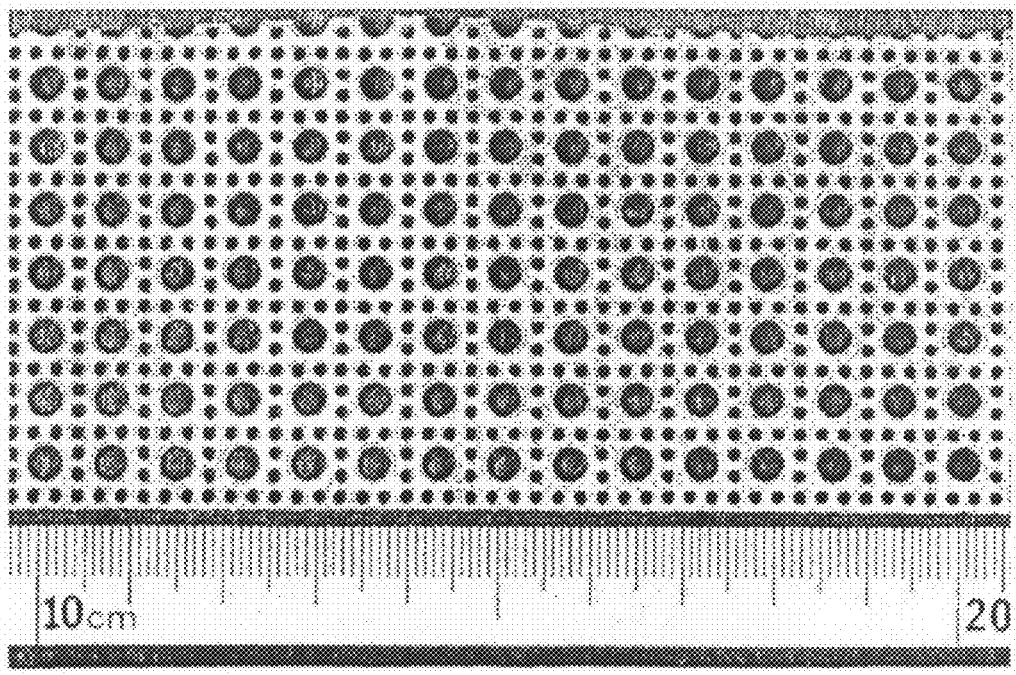

As another example, the MIL composite layer may be filled with perforation patterns or holes embedded with suitable hard materials to further improve the hardness of the layer. FIG. 7 illustrates one example where perforated aluminum sheets with different kinds of perforation patterns are used to form the MIL composite material and the perforations are filled by either a hard ceramic or another metal.

Figure 8A:
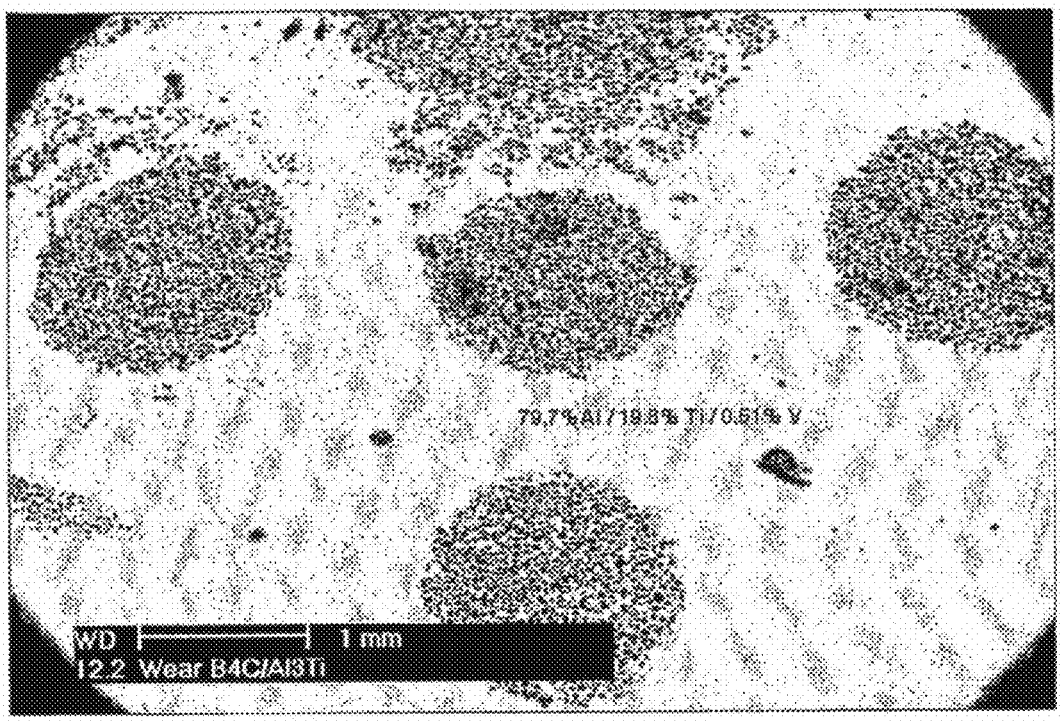
Figure 8B:
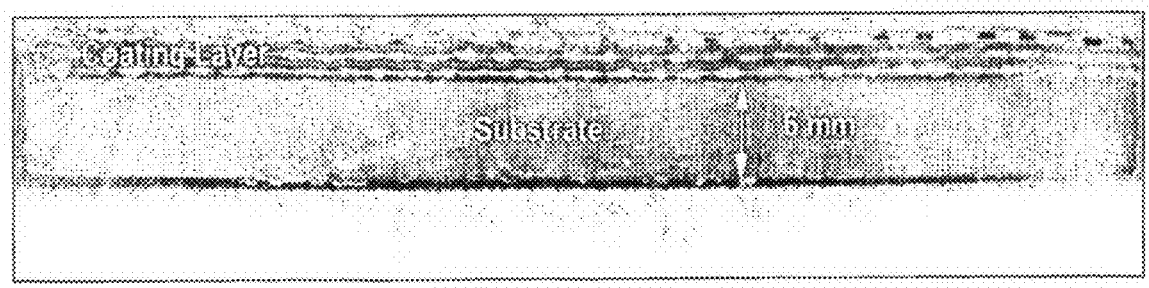
Figure 8C:
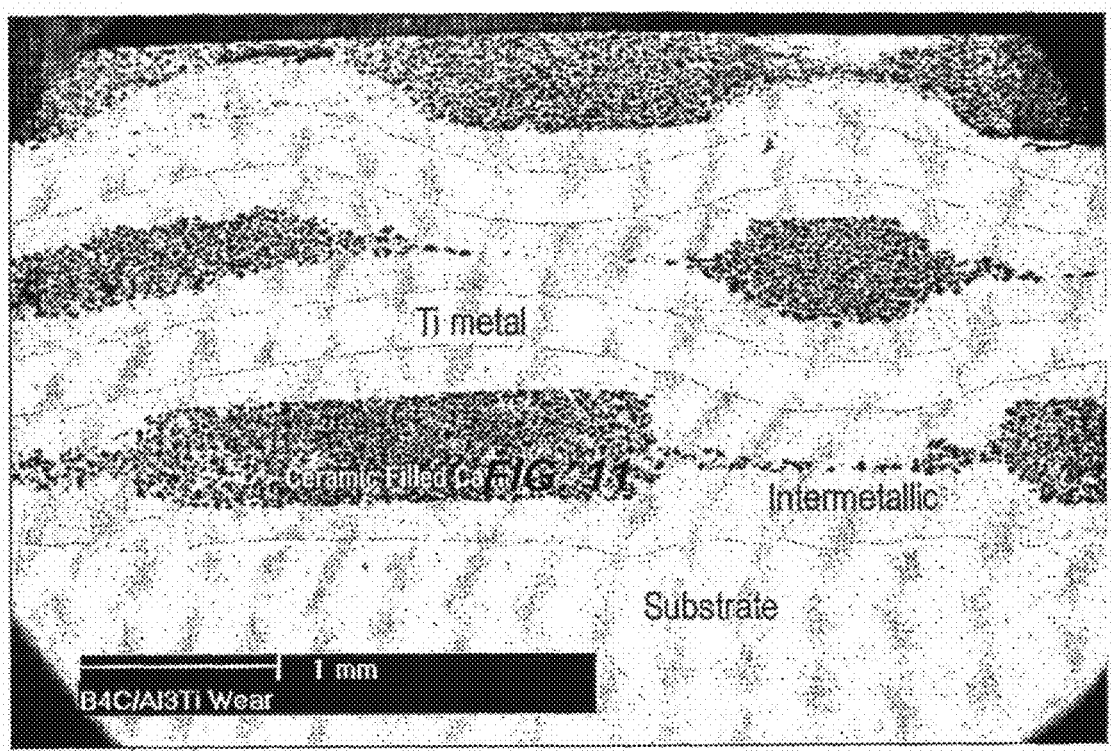

When the perforations are filled with ceramics, such ceramics may include boron carbide, tungsten carbide, silicon carbide etc. FIGS. 8A and 8B show photographs of the top surface view and cross-sectional view, respectively, of an exemplary wear and corrosion coating made from perforated aluminum sheets filled with boron-carbide powder. Because each perforated aluminum sheet is sandwiched between two Ti sheets before fabrication, cavities are formed in the intermetallic layer after the fabrication and are filled with the ceramic materials infiltrated with Al or the intermetallic phase. FIG. 8C shows an enlarged view of the cross-sectional view of FIG. 8B to illustrate examples of the ceramic-filled cavities.

Figure 9A:
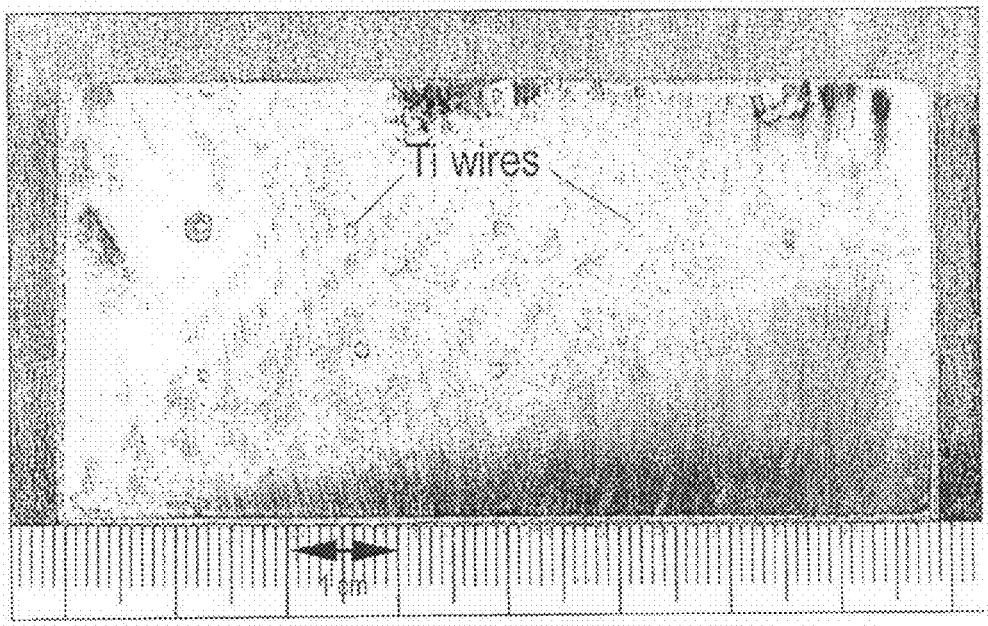
Figure 9B:
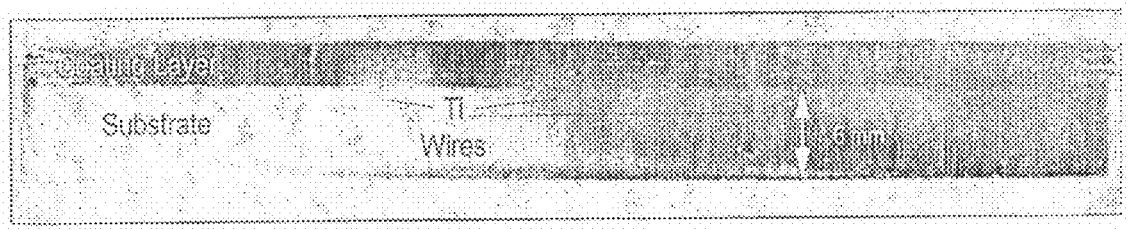
Figure 9C:
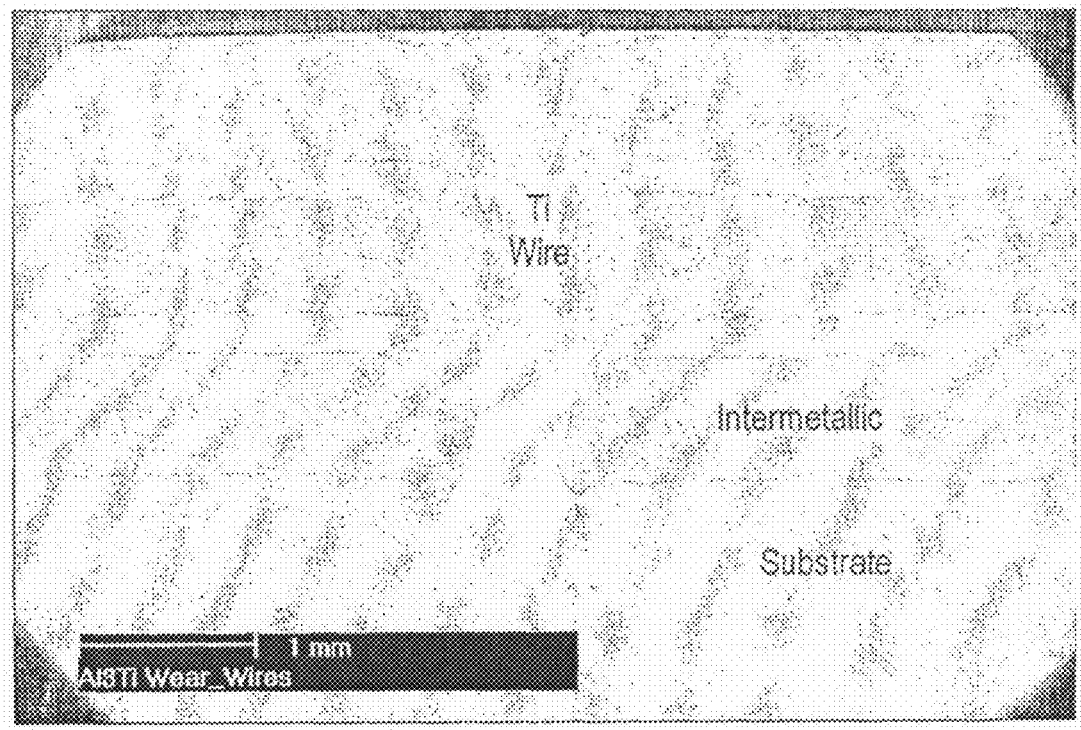

A metal substrate coated with hard layer may also be strengthened by having vertical hard metal wires embedded in the hard layer and the substrate. FIGS. 9A, 9B, and 9C illustrate one example of a wire toughened substrate coated with a MIL composite layer. Before the processing under head and pressure to form the hard layer, holes may be formed, e.g., drilled, into the aluminum and titanium sheets for forming the MIL composite layer and similar matching holes are also formed in the substrate. Titanium wires of similar diameter as that of the holes are inserted through the sheets into the substrate. Upon completion of processing, the Ti wires are metallurgically bonded to the MIL composite layer and the substrate. FIG. 9A shows a top-surface photograph of a sample fabricated with Ti wires connecting the substrate plate and the hardened surface layer. FIG. 9B shows a cross-section photograph of a sample fabricated with Ti wires connecting the substrate plate and the hardened surface layer. FIG. 9C shows a micrograph of the cross-section of one of the Ti wires.

The wired toughened structure may be fabricated in the following process in one implementation. The substrate, with alternating layers of titanium and aluminum sheets placed on its surface, is placed in between two heater platens, e.g., the system in FIG. 2. These platens are compressed between the constraints of a load frame with mechanical fixtures designed to distribute the load uniformly across the substrate area. The entire assembly is then reacted in a load-temperature cycle. Upon the completion of the reaction, the assembly is cooled gradually to minimize separation of the layers due to thermal expansion mismatch between the various constituents of the assembly. The final structure includes the substrate, un-reacted titanium layers, and titanium trialuminide layers. In the case of a decorated composite sample, the titanium trialuminide layer also includes embedded ceramic within the embedding pattern.

In another aspect, MIL composite layers may be structured to include vibration-damping cavities filled with loose powder materials to absorb vibration energy. This damping mechanism is passive and is built into a MIL composite material structure. Hence, the so fabricated MIL composite material can inherently damp vibrations. In one implementation, such damping cavities may be spatially distributed at positions of high amplitude displacement of vibrations in a MIL composite material. For example, titanium (metal)-Titanium Trialuminide (intermetallic) composites may be designed with such cavities to achieve enhanced vibration damping properties in specific vibration modes while simultaneously possessing high strength, high toughness, low density and good corrosion resistance.

Figure 10A:
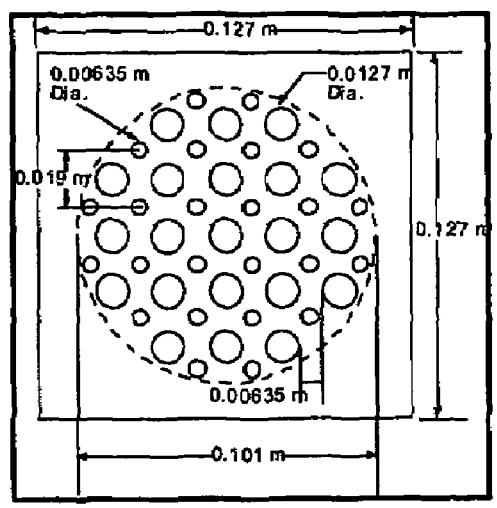
FIGS. 10A, 10B, and 10C show an example of a MIL composite material having passive vibration-damping cavities.
Figure 10B:
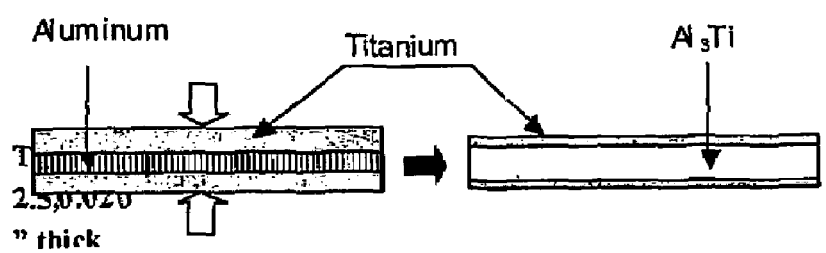
Figure 10C:
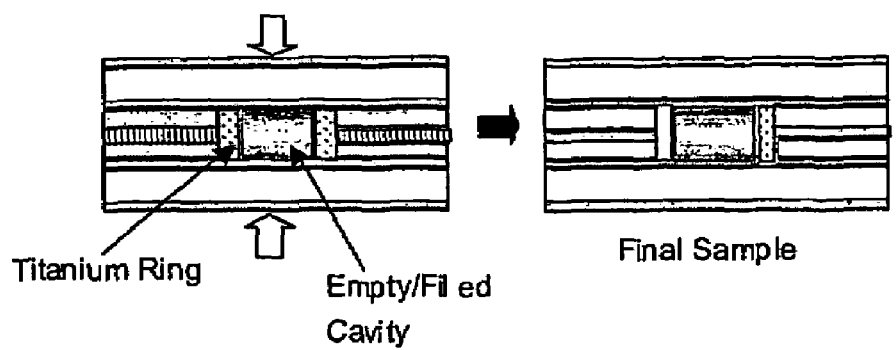

FIGS. 10A, 10B, and 10C illustrate one implementation of the fabrication process for making a MIL composite material with damping cavities. First, the vibration modes for a give MIL composite material are determined. Damping cavities are designed to be located at positions of high amplitude displacement of these vibration modes. Holes of a desired size are formed, e.g., by drilling, in titanium and aluminum sheets at such pre-determined locations. The drilled layers are then stacked on top of each other to create a pattern of cylindrical cavities. FIG. 10A illustrates one example of a MIL composite material with marked hole locations. Two differently sized holes are shown. The drilled layers may be a 3-layer structure by stacking Al/Ti/Al on top of each other. Next, a titanium ring of the same outer diameter as the cavity is pushed into the cavity. The height of the ring is made to be the same as the height of the cavity. Alternatively, Ti cups may be used to replace the rings. Furthermore, rings or cups may be eliminated and "bare" hole are used to receive the powder material.

FIG. 10B shows that separate stacks of Ti/Al/Ti sheets without any holes are provided and are reacted under load and at a high temperature within a load frame to form MIL composite plates of Ti/Al$_3$Ti/Ti. Notably, the external layers of the plates are Ti layers in order to metallurgically bond with the external Al layers of the drilled stack of Ai/Ti/Al layers to form an intermetallic layer. Next, the drilled stack of Al/Ti/Al layers is placed on top of one MIL composite plate made in FIG. 10B. A suitable granular material is filled into the cavities in desired volume fraction. Examples of the granular material include but are not limited to tungsten carbide, solid glass spheres, titanium diboride, aluminum oxide, and silicon carbide. The holes are then covered up with another MIL composite plate. As illustrated in FIG. 10C, this entire assembly is processed under pressure and heat to cause reaction between the contacted layers of the drilled stack and the two MIL composite plates. Optionally, Ti sticks or strips may be placed with each hole to provide support of the layers above and below the hole.

The above and other MIL composite structures may incorporate sensors embedded or buried within each structure so that a condition or behavior of the structure may be measured and monitored. Such sensors provide material "intelligence" of a given structure. In addition, a control mechanism may be implemented in such an intelligent material structure to control a condition or behavior of the structure and the sensors and the control mechanism may be connected to form a control feedback loop so that the entire structure may be intelligently self-controlled. Such materials are smart and multi-functional materials. Various useful functions may be implemented within the materials such as damage detection, health monitoring, temperature sensing, actuation etc.

As an example, a piezoelectric sensor may operate as both a source and a receiver of ultrasonic pulses, a network of such embedded sensors may be used to determine the location and extent of internal structural damage. Such a network could also be used to locate external impacts on the structures; such as those caused by projectiles. Further, piezoelectric crystals may be used to dissipate vibration energy as electrical energy by connecting them in an electrical circuit.

Figure 11A:
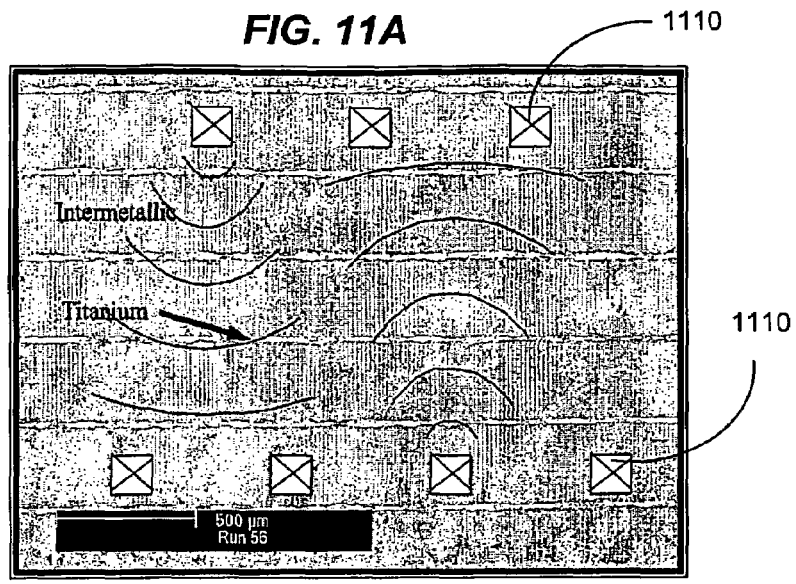
FIGS. 11A and 11B show examples of MIL composite materials having embedded sensors.
Figure 11B:
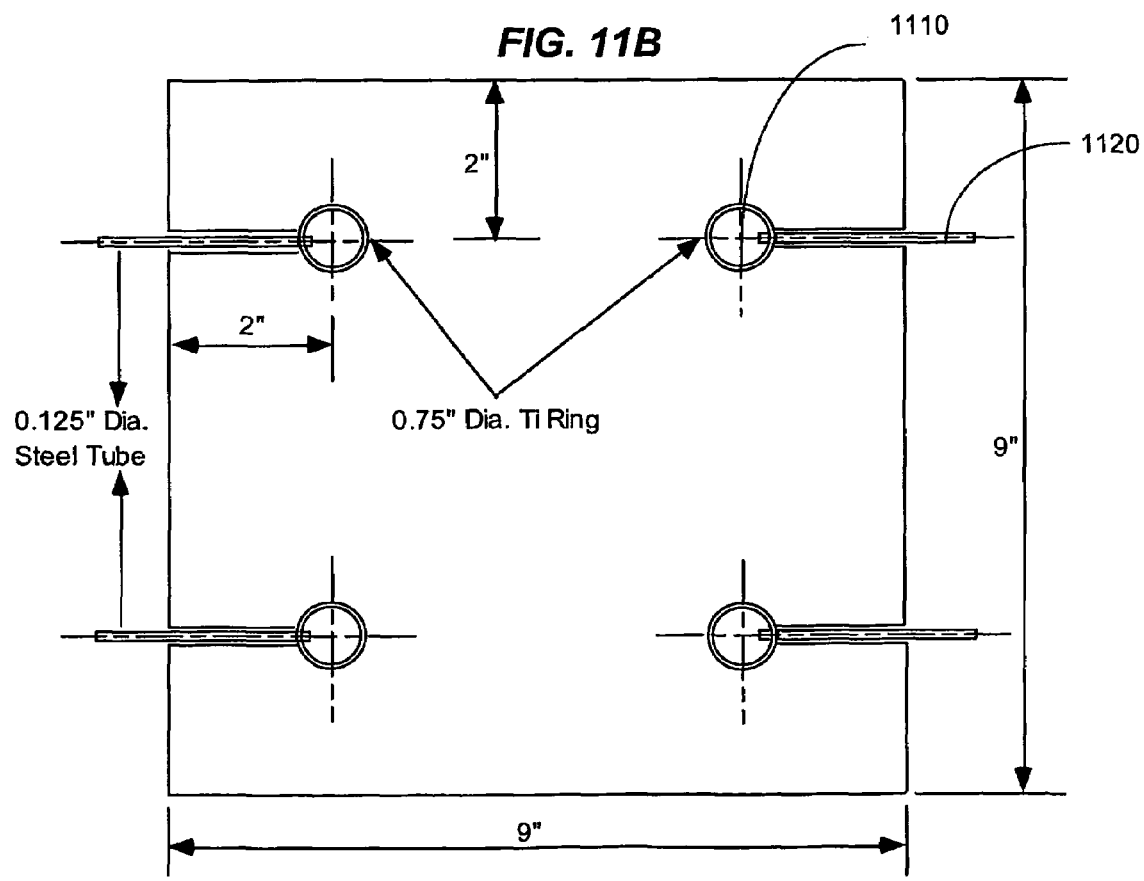

FIG. 11A illustrates one example of an intelligent MIL composite material where sensors 1110 ape embedded at selected locations. For example, vibration sensors 1110 are distributed in the top and the bottom intermetallic layers of the material to measure any impact and the distribution of the impact. FIG. 11B further shows that each embedded sensor 1110 may include conductive wires to output an electrical signal that represents the magnitude of the impact at the location of the sensor. Various vibration sensors may be used, including piezo-electric sensors that generate electrical signals in response to compression applied to the sensors.

Embedding sensors within metallic materials such as a MIL composite material, however, may experience a high temperature during fabrication process that can exceed 500° C. and may reach the range of about 1000° C. A Ti/Al based MIL composite is fabricated by reacting alternate layers of Ti and Al between 660° C. and 750° C. with the reaction occurring over typically 6-8 hours. The Al reacts with Ti to form Al3Ti resulting in a final structure comprising alternate layers of Ti and Al3Ti. Piezoelectric sensors embedded within the MIL composites, hence, should sustain the integrity and function at such high temperatures. Lithium-niobate piezoelectric sensors may be designed to operate at such temperatures. Other sensors may also be used.

Figure 12A:
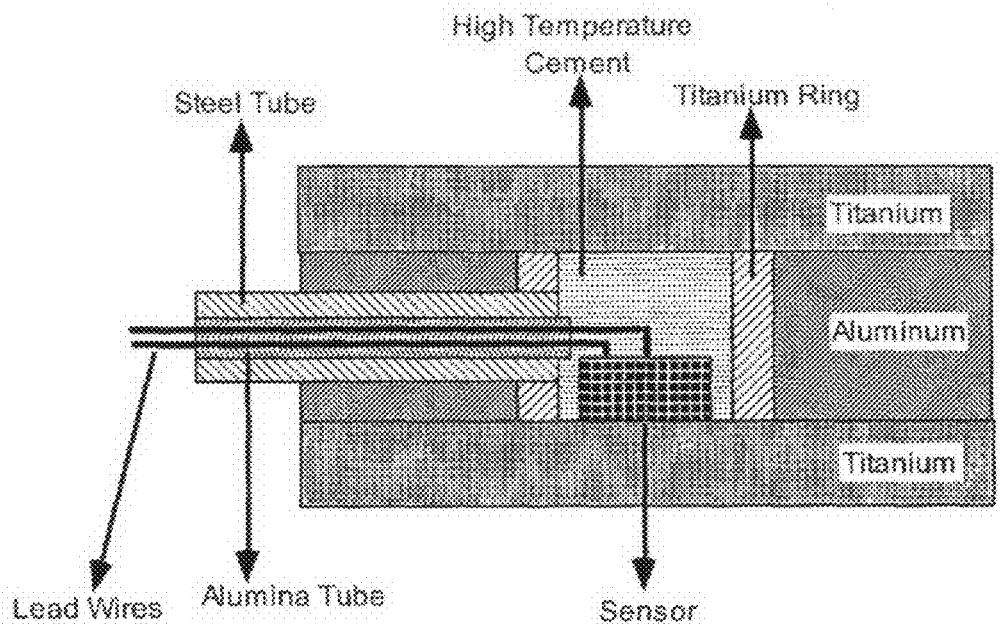
FIGS. 12A and 12B illustrate one implementation of an embedded vibration sensor in a MIL composite material.
Figure 12B:
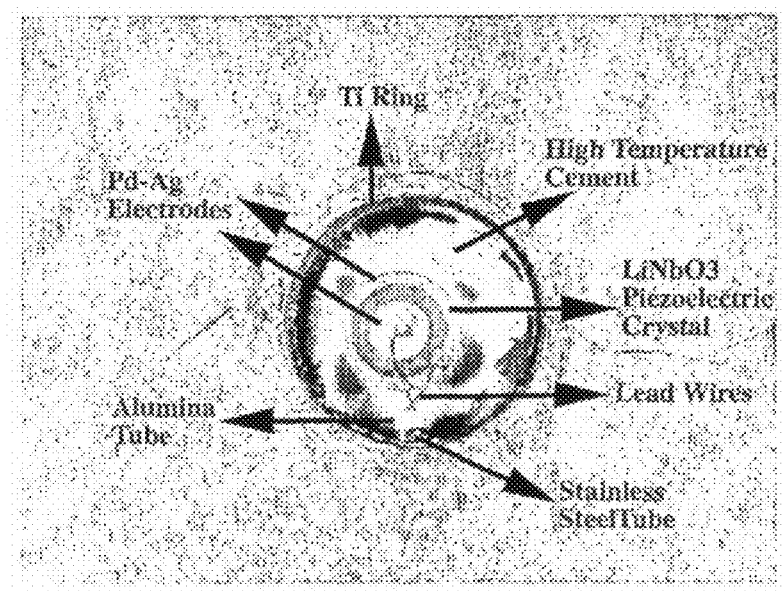

FIGS. 12A and 12B show one example of a MIL composite material with an embedded piezoelectric sensor. In this particular example, the basic materials used in the fabrication of the MIL composite may be 0.020" thick Ti-6-4 alloy sheets and 0.024" thick 1100 Al alloy sheets. The fabrication of the composite with embedded piezoelectric sensors may be carried in the following five processing steps. First, several Ti-6-4 alloy sheets and 1100 Al alloy sheets are stacked alternately and reacted under pressure and heat to form two MIL composite plates, each approximately 0.325" thick. In the second step, four 0.75" diameter holes corresponding to 4 sensors are machined out in another stack (total height 0.150") of alternately placed Ti-6-4 sheets and 1100 Al alloy sheets. A close-fitting titanium ring, with a hole machined in its wall, is placed in each of the four holes in the sheets. Rectangular slots are machined in the sheets, adjacent to each of the holes and a steel tube are placed in the slot. One end of the steel tube is inserted into the hole in the titanium ring, while the other end of the tube extended outside the stack. Thus, at the end of the second step, an un-reacted stack of Ti and Al sheets with titanium rings is provided and steel tubes are placed in their appropriate locations.

Next in the third step, the assembly of the second step is compressed in a load frame at about 600° C. for several hours and is then cooled down. In the fourth step, the piezoelectric sensors are carefully placed in their respective holes and their lead wires are passed through an alumina tube placed within the metal tube. The sensors are then sealed in the cavity using a high-temperature cement paste (Ceramabond 571, Aremco Products, USA) which is then cured for several hours at room temperature followed by curing at about 100° C. Finally, one pre-reacted plate (from step 1) is placed on each side of the stack containing the sensors (step 4), and then processed in the same manner as in step 1.

In one implementation, the piezoelectric sensors may be a 36° Y-cut LiNbO3 crystals from Boston Piezo-optics (Massachusetts, USA). The Curie temperature for the crystals is about 1200° C. and is higher than the maximum processing temperature of about 700° C. in fabricating the MIL composite material. The crystals may be sized to be 0.5" in diameter and 0.078" tall with a co-axial electrode pattern.

Only a few implementations are described. However, other implementations, variations and enhancements may be made.

What is claimed is:

1. A method for manufacturing an article, comprising:
   providing a metal box having an opening and a metal lid plate for closing the opening;
   placing a stack of alternating first metal and second metal layers inside the metal box, wherein a first metal in the first metal layers and a second metal in the second metal layers are operable to react under heat and pressure to form an intermetallic material;
   closing the opening with the metal lid plate to compress the stack inside the box to contact each inner metal wall of the box; and
   applying pressure and heat to the closed metal box to compress the stack and to cause reaction between two adjacent layers in the stack and reaction between the stack and each inner metal wall of the box to form metalurgical bonding between adjacent layers in the stack and between the stack and the metal box.

2. The method as in claim 1, wherein the first metal comprises titanium.

3. The method as in claim 1, wherein the second metal comprises aluminum.

4. The method as in claim 1, wherein the first metal comprises a titanium alloy.

5. The method as in claim 1, wherein the first metal comprise titanium and the second metal comprises aluminum.

6. The method as in claim 1, wherein the first metal comprises nickel.

7. The method as in claim 1, wherein the first metal comprises a nickel alloy.

8. The method as in claim 1, wherein the first metal comprises vanadium.

9. The method as in claim 1, wherein the first metal comprises a vanadium alloy.

10. The method as in claim 1, wherein the first metal comprises iron.

11. The method as in claim 1, wherein the first metal comprises an iron alloy.

12. The method as in claim 1, wherein the first metal comprises tantalum.

13. The method as in claim 1, wherein the first metal comprises a tantalum alloy.

14. The method as in claim 1, wherein the first metal comprises an aluminide-forming metal or alloy.

15. The method as in claim 1, wherein the second metal comprise an aluminum alloy.

16. The method as in claim 1, wherein the second metal comprise an aluminum metal matrix composite.

17. The method as in claim 1, wherein the second metal comprise an aluminum-infiltrate ceramic composite.

18. The method as in claim 1, wherein the first metal comprises a metal or alloy that forms intermetallic compounds with magnesium, including aluminum and its alloys.

19. The method as in claim 1, wherein the second metal comprises magnesium.

20. The method as in claim 1, wherein the second metal comprises a magnesium alloy.

21. The method as in claim 1, wherein the second metal comprise a magnesium metal matrix composite.

22. The method as in claim 1, wherein the second metal comprise a magnesium-infiltrate ceramic composite.

* * * * *

UNITED STATES PATENT AND TRADEMARK OFFICE
CERTIFICATE OF CORRECTION

PATENT NO. : 7,621,435 B2
APPLICATION NO. : 11/629578
DATED : November 24, 2009
INVENTOR(S) : Kenneth S. Vecchio, Aashish Rohatgi and John B. Kosmatka It is certified that error appears in the above-identified patent and that said Letters Patent is hereby corrected as shown below:

IN THE CLAIMS:
Column 12, line 21 (Claim 1), delete "metalurgical" and insert --metallurgical--;
Column 12, lines 29-30 (Claim 5), delete "comprise" and insert --comprises--;
Column 12, line 50 (Claim 15), delete "comprise" and insert --comprises--;
Column 12, line 52 (Claim 16), delete "comprise" and insert --comprises--;
Column 12, line 54 (Claim 17), delete "comprise" and insert --comprises--;
Column 12, line 63 (Claim 21), delete "comprise" and insert --comprises--;
Column 12, line 65 (Claim 22), delete "comprise" and insert --comprises--.

Signed and Sealed this

Eleventh Day of May, 2010

David J. Kappos
*Director of the United States Patent and Trademark Office*